Patented June 24, 1952

2,601,668

UNITED STATES PATENT OFFICE 2,601,668

STABILIZED BARIUM AND STRONTIUM LITHOL TONERS

Volney Tullsen, Westfield, N. J., assignor to American Cyanamid Company, New York, N. Y., a corporation of Maine No Drawing. Application September 27, 1949, Serial No. 118,177

8 Claims. (Cl. 260—33.4)

This invention relates to new physical forms of barium and strontium lithol toners and to processes of preparing them.

One of the most important recent developments in the printing ink field has been the introduction of so-called vapor setting inks, which dry by precipitation on contact with moisture. These inks are formulated with a high-boiling water-soluble vehicle, such as diethylene glycol, and special synthetic resins which are soluble in the vehicle but lose their solubility when the solvent is diluted with water. The inks are printed in the usual manner, and then exposed to steam, water vapor, or (in some cases) simply to the ordinary moisture of the atmosphere. The resulting dilution of the vehicle causes precipitation and setting.

These inks offer striking practical advantages, including cleanness and brilliance of color, freedom from odor, and fast setting, and consequently have found widespread use in a number of important applications. Nevertheless their adoption has been hindered by the serious drawback that certain of the most important known pigments have not proved well suited for use in vapor setting formulations, but create serious practical difficulties when such use is attempted.

One of the most important types of pigments are the so-called lithol toners, which are prepared by diazotizing Tobias acid (2-naphthylamine-1-sulfonic acid) and coupling with beta-naphthol. For shading purposes, the Tobias acid is frequently mixed with a portion of another amino sulfonic acid, such as 1-naphthylamine-2-sulfonic acid. These colors are usually employed in the form of their alkaline earth metal lakes. Unfortunately when these lakes are incorporated in vapor setting inks, they exhiblt a serious color instability and also show a strong tendency to cause the ink to "body," or gain in viscosity. For example, barium lithols shift color from the desired bright red to a dull orange shade, and the ink increases in viscosity until it becomes useless and is practically semi-solid.

According to the present invention it is found that the barium and strontium lithol toners may be transformed into a different physical form in which they no longer show any change in color when incorporated into vapor setting inks and stored, and do not tend to cause the ink to body. There does not appear to be a change in the chemical constitution but the crystal structure is different, and this is shown by differences in the X-ray diffraction patterns obtained from the powdered pigments. Thus the new barium lakes show a doublet line corresponding to an interplanar spacing of 3.39 and 3.53 Å. in place of a single line in the unstable product at about 3.47 Å. There also appears a doublet in the stable lakes at about 4.22 and 4.37 Å., in which region the unstable pigment shows no diffraction pattern lines. A third difference, which while definite is somewhat less striking, is the shift of the doublet in the unstable form from 5.7 and 6.1 Å. to 5.5 and 5.9 Å. in the stable form. The stable strontium lake shows a similar change in diffraction pattern, the single line at 3.04 Å. in the unstable being replaced by a doublet at 2.83 and 2.94 Å. in the stable form. The single line at 3.42 Å. in the unstable lake is replaced by a doublet at 3.35 and 3.48 Å., and a strong line at 4.33 Å. in the unstable lake is transformed into a somewhat weaker doublet at 4.18 and 4.30 Å. Another difference, though not so striking, is the shift of a strong line at 8.7 Å. in the unstable lake to 8.2 Å. in the stable form.

Throughout the specification and claims the term "lithol toners" will be used to denote lakes of the azo dyes obtained by coupling beta-naphthol with a diazo compound having diazotized Tobias acid as its major constituent.

It is not intended to limit the products of the present invention to any particular process. However, in a narrower aspect, certain preferred processes constitute a part of the present invention. Essentially these processes comprise heating the unstable barium or strontium lithol toner with an oxygen-containing organic liquid selected from the group consisting of mono-, di-, and triethylene glycols and dioxane. The process starts when the temperature is raised above room temperature, but is too slow for economical practical use below 50° C. At higher temperatures the change is more rapid, but of course, the temperature must be kept below that at which either the solvent or the pigment starts to decompose. This sets a practical limit with most solvents of about 200° C.

As with most transformations of organic pigments, the time required for composition will vary with the temperature. Good results can be obtained with barium lithol toners by exposure to diethylene glycol at 50° C. for from three hours to a day. At higher temperatures the time is much shorter, the minimum time being about ten minutes for practical operation at maximum temperature. Inasmuch as longer heating, within reason, does not damage the stabilized toner, it is usually desirable to heat for a little longer than the absolute minimum time, as the change can be made to work at any particular temperature. It is important in practical operations to be sure that the physical change to the stable crystal form is complete. Such a procedure requires a minimum of critical control, which is a practical operating advantage.

While mono-, di-, or triethylene glycol can be used, diethylene glycol is preferred because this is a common solvent in vapor setting inks, and it is thus possible to produce a mixture from the heating step which can be incorporated into an ink without separation of the stabilized lithol toner from the solvent in which it was stabilized.

It is another advantage of the present invention that the amount of solvent is not critical. Of course, it is necessary to use sufficient solvent to thoroughly wet the pigment. Somewhat larger amounts of solvent, for example, an amount equal to the weight of the pigment, would give better operating conditions since it would permit stirring which, though not essential, is desirable. Larger amounts of solvent do no harm but as they do not improve the results they are normally not as desirable for excessively large amounts will increase the cost of operation.

As has been pointed out above, the suspension, or dispersion, of the pigment in the solvent may be used directly for incorporation into a vapor setting ink. For some purposes, however, it is desirable to market a dry pigment, and this may be accomplished easily by filtering the pigment after stabilization, washing it with water, and drying. It is an advantage of the present invention that once stabilized the lithol toner can be kept indefinitely without losing its desirable properties.

Since vapor setting inks are usually prepared with solvents of the same class as those used in stabilization, it becomes of interest to note the results of heating the unstable toner in the finished ink. This produces the same change in crystal structure as shown by the X-ray diffraction pattern as when the heating is in the solvent alone. In other words, the resins and other constituents of the ink do not appear to interfere with the transformation of the lithol toner from the unstable to the stable crystal structure. However, when heated in the ink, of course, the ink bodies and becomes unfit for printing use. However we have found that if the bodied ink is then re-milled, for example on a multiple-roller ink mill, it is again thinned out and thereafter remains thin because the lithol toner has been transformed into the stable form and does not become unstable by re-milling. For certain purposes this second modification of the process presents advantages and is therefore included within the scope of the invention.

The invention will be described in greater detail in conjunction with the following specific examples, the parts being by weight.

Example 1

375 parts of diethylene glycol are mixed with 125 parts of barium lake from the azo dye obtained by coupling diazotized Tobias acid with beta-naphthol. This mixture is heated for about a day at 80° C., producing a suspension of barium lithol toner which shows the crystal structure defined by the X-ray diffraction pattern described above as typical of the stable form of the pigment.

There is then added, 50 parts of diethylene glycol and 284 parts of an alcohol-soluble fumaric acid-modified alkyd resin having an acid number from 300–330 and softening point of 148–151° C. The mixture is transformed into a smooth ink by five passes on a three-roller ink mill. The color of the ink and its viscosity are stable on storage.

If an ink is prepared with the same ingredients, but without heating the lithol toner in diethylene glycol, its color shifts to a dull orange shade on storage and serious bodying takes place.

Example 2

10 parts of the barium lithol toner used in Example 1 is heated with 35 parts of diethylene glycol at 80° C. for about a day. The mixture is then slurried with 800 parts of water, filtered, washed free of diethylene glycol, and dried. A pigment is obtained which has a lighter and yellower shade, and which forms stable inks in typical vapor setting formulations.

Example 3

The procedure of Example 1 is followed, but the diethylene glycol is replaced with ethylene glycol. The results are the same, and the same stable pigment is also obtained if triethylene glycol is used in place of ethylene glycol.

Example 4

The barium lithol toner used in Example 1 is heated overnight at 80–100° C. with an amount of dioxane corresponding to the diethylene glycol used in Example 2. The product is filtered, washed and dried as described in Example 2 and then is made into a vapor setting ink with diethylene glycol and the alkyd resin described in Example 1. The ink shows much greater color stability and freedom from bodying than when the untreated toner is used.

The same results are obtained when a mixture of equal parts of dioxane and ethylene glycol are used in place of the dioxane alone.

Example 5

A vapor setting ink is prepared from 7 parts of barium lithol toner, 23 parts of diethylene glycol and 16 parts of an alcohol-soluble fumaric acid-modified alkyd resin, having a softening point of 148–151° C. and an acid number of 300–330. The ink is made in the usual manner by milling on a three-roller ink mill. The ink is then heated at 80–100° C. until it has thickened to a useless, semi-solid condition and has changed markedly to an orange shade of red. The ink is then re-milled on a three-roller ink mill until its original fluidity is regained. This ink is stable and does not deteriorate on storage.

Example 6

10 parts of barium lithol toner are heated with 20 parts of diethylene glycol at 50° C. for forty-five minutes. The mixture is then slurried with 750 parts of water, filtered, washed, and dried. The resulting pigment gives stable formulations in vapor setting inks.

Example 7

8 parts of barium lithol toner are heated for three hours at 60° C. with 10 parts of diethylene glycol. The reaction mixture is then stirred thoroughly with 300 parts of water, filtered, washed free of solvent, and dried. It gives stable vapor setting inks.

Example 8

360 parts of strontium lake from the azo dye derived from diazotized Tobias acid and beta-naphthol, and 640 parts of diethylene glycol, are heated overnight at 80° C. The resulting strontium toner shows the crystal structure defined above as typical of the stable pigment, as distinct from the untreated pigment. Vapor setting ink made from the stabilized pigment shows high resistance to changes in color and viscosity on storage.

*Example 9*

10 parts of barium lithol are heated with 25 parts of triethylene glycol at 65° C. for six hours. The mixture is then thoroughly stirred with 90 parts of water, filtered, washed, and dried. The pigment so obtained shows substantially increased stability in vapor setting ink formulations.

I claim:

1. A process of transforming an unstable lithol toner, selected from the group consisting of barium and strontium lithol toners, into a stable form which comprises heating the toner in an oxygen-containing organic liquid selected from the group consisting of mono-, di-, and triethylene glycols and dioxane at a temperature ranging from about 50° C. to about 200° C. and for a time period ranging from about 10 minutes to about a day, until transformation into the stable crystal structure is substantially complete.

2. A process according to claim 1 in which the liquid is diethylene glycol.

3. A process of preparing a vapor setting ink containing a stable lithol toner which comprises milling an unstable lithol toner selected from the group consisting of barium and strontium lithol toners into an alkyd resin containing an organic liquid selected from the group consisting of mono-, di-, and triethylene glycols and dioxane until an ink is formed, heating the ink until the unstable lithol toner is transformed into the stable crystal structure, and re-milling the heated ink to printing viscosity.

4. A process according to claim 3 in which the toner is a barium lithol toner.

5. A process according to claim 3 in which the toner is a strontium lithol toner.

6. A process of preparing a vapor setting ink containing a stable lithol toner which comprises milling an unstable lithol toner selected from the group consisting of barium and strontium lithol toners into an alkyd resin solution in diethylene glycol until an ink is formed, heating the ink until the unstable lithol toner is transformed into the stable crystal structure, and re-milling the heated ink to printing viscosity.

7. A process according to claim 6 in which the toner is a barium lithol toner.

8. A process according to claim 6 in which the toner is a strontium lithol toner.

VOLNEY TULLSEN.

REFERENCES CITED

The following references are of record in the file of this patent:

UNITED STATES PATENTS

| Number | Name | Date |
|---|---|---|
| 1,077,655 | Ulricks | Nov. 11, 1913 |
| 1,806,965 | Clewell | May 26, 1931 |
| 1,927,395 | Sayler | Sept. 4, 1934 |
| 2,138,836 | Brower | Dec. 6, 1938 |
| 2,174,501 | Reich | Sept. 26, 1939 |
| 2,306,863 | Bour | Dec. 29, 1942 |
| 2,335,882 | Pingarron | Dec. 7, 1943 |
| 2,375,230 | Kline | May 8, 1945 |

FOREIGN PATENTS

| Number | Country | Date |
|---|---|---|
| 859 | Great Britain | of 1863 |
| 117,163 | Switzerland | Oct. 16, 1926 |

OTHER REFERENCES

Serial No. 300,234, Durr et al. (A. P. C.), published April 20, 1943.